United States Patent [19]
Asay

[11] Patent Number: 5,471,098
[45] Date of Patent: Nov. 28, 1995

[54] DEVICE FOR CONNECTING FLOW ENERGY OF WATER INTO ELECTRICAL ENERGY

[76] Inventor: Bill Asay, 711 Sapphire Ave., Billings, Mont. 59105

[21] Appl. No.: 312,087

[22] Filed: Sep. 26, 1994

[51] Int. Cl.⁶ .............................. F03B 13/10; F03B 3/14
[52] U.S. Cl. .................. 290/54; 290/53; 415/7; 416/85; 416/86; 416/119
[58] Field of Search ................. 290/42, 43, 53, 290/54; 415/7; 416/85, 86, 119

[56] References Cited

U.S. PATENT DOCUMENTS

| | | | |
|---|---|---|---|
| 249,899 | 11/1881 | Clarke | 416/85 |
| 611,874 | 10/1898 | Turner | 416/85 |
| 1,392,893 | 10/1921 | King | 416/85 |
| 3,922,012 | 11/1975 | Herz | 290/54 |
| 4,424,451 | 1/1984 | Schmidt | 290/54 |

Primary Examiner—Thomas M. Dougherty
Assistant Examiner—Robert Lloyd Hoover
Attorney, Agent, or Firm—Terry M. Gernstein

[57] ABSTRACT

A device is located in a body of flowing water and includes a bridge supporting an electrical generator and anchors for holding the bridge stationary with respect to water flowing past that bridge. The device includes a water wheel submerged in the water beneath the bridge and which includes a plurality of arms radiating outwardly from a central arm. A hydrowing is movably attached to each radial arm and includes two flow impact sections of different surface areas. The hydrowings move with respect to the radial arms to maintain a flow area facing upstream on one side of the central arm that is larger than the flow area facing upstream on the diametrically opposite side of the central arm. This unbalanced flow area creates a force on the central arm tending to rotate that central arm. The central arm is connected to a rotor.

9 Claims, 2 Drawing Sheets

DEVICE FOR CONNECTING FLOW ENERGY OF WATER INTO ELECTRICAL ENERGY

TECHNICAL FIELD OF THE INVENTION

The present invention relates to the general art of power conversion, and to the particular field of water wheels.

BACKGROUND OF THE INVENTION

In recent times, efficient power generation has become a focus of attention. This is especially true on farms which often use great quantities of power. However, it is also true in many other applications, including camping and rural areas as well.

For this reason, many farms use a variety of systems for converting one form of power into electrical power. Historically, many farms have used wind power to generate electricity. Other farms that have access to a water fall have used water power to generate electricity. More recently, solar power has been used to generate the electricity needed for farms as well as other uses. Still further, where possible, a combination of these power conversion systems has been used. However, with modern society, there is always a need for still more efficient and adaptable methods for converting one form of power, especially naturally occurring forms, into electrical power. These more efficient means can be used to supplement, or even supplant, other means and systems that are presently in use.

These more efficient and adaptable forms of power generators are even more needed for farms and remote areas than in other areas. This is especially true if the area does not have access to a source of wind or a source of water that is sufficiently sized to meet the needs of the serviced area, or if solar energy is not practical for the particular area.

Therefore, there is a need for a means to convert water flow energy into electrical power, especially in an area which only has small and slow moving streams. Still further, there is a need for a means for converting water flow energy into electrical power that is amenable to use in a wide variety of locations.

OBJECTS OF THE INVENTION

It is a main object of the present invention to provide a power conversion system that can be used in small streams to convert water flow energy into electrical energy.

It is another object of the present invention to provide a power conversion system that can be used in small streams to convert water flow energy into electrical energy and which can be used in a wide variety of applications and locations.

SUMMARY OF THE INVENTION

These, and other, objects are achieved by a device that floats in a stationary position in a stream and converts the energy associated with the stream water flowing past the device into electrical power. Specifically, the device includes an electrical generator connected to a paddle wheel. The paddle wheel is rotated by the water flowing past the device.

More specifically, the paddle wheel includes a plurality of arms radiating outwardly from a central arm. Each radial arm has a hydrowing movably attached thereto. The hydrowings are sized and oriented to present a surface area in the upstream direction which is greater on one side of the central arm than on a diametrically opposed side of that central arm. The hydrowings move as the central arm rotates in order to achieve this result. The unequal area creates an unbalance force on the central arm which rotates that arm.

The central arm is connected to the power generator to move a rotor element for generating electricity in a manner that is common to such generators.

BRIEF DESCRIPTION OF THE DRAWING FIGURES

DETAILED DESCRIPTION OF THE PREFERRED EMBODIMENT OF THE INVENTION

Figure 1:
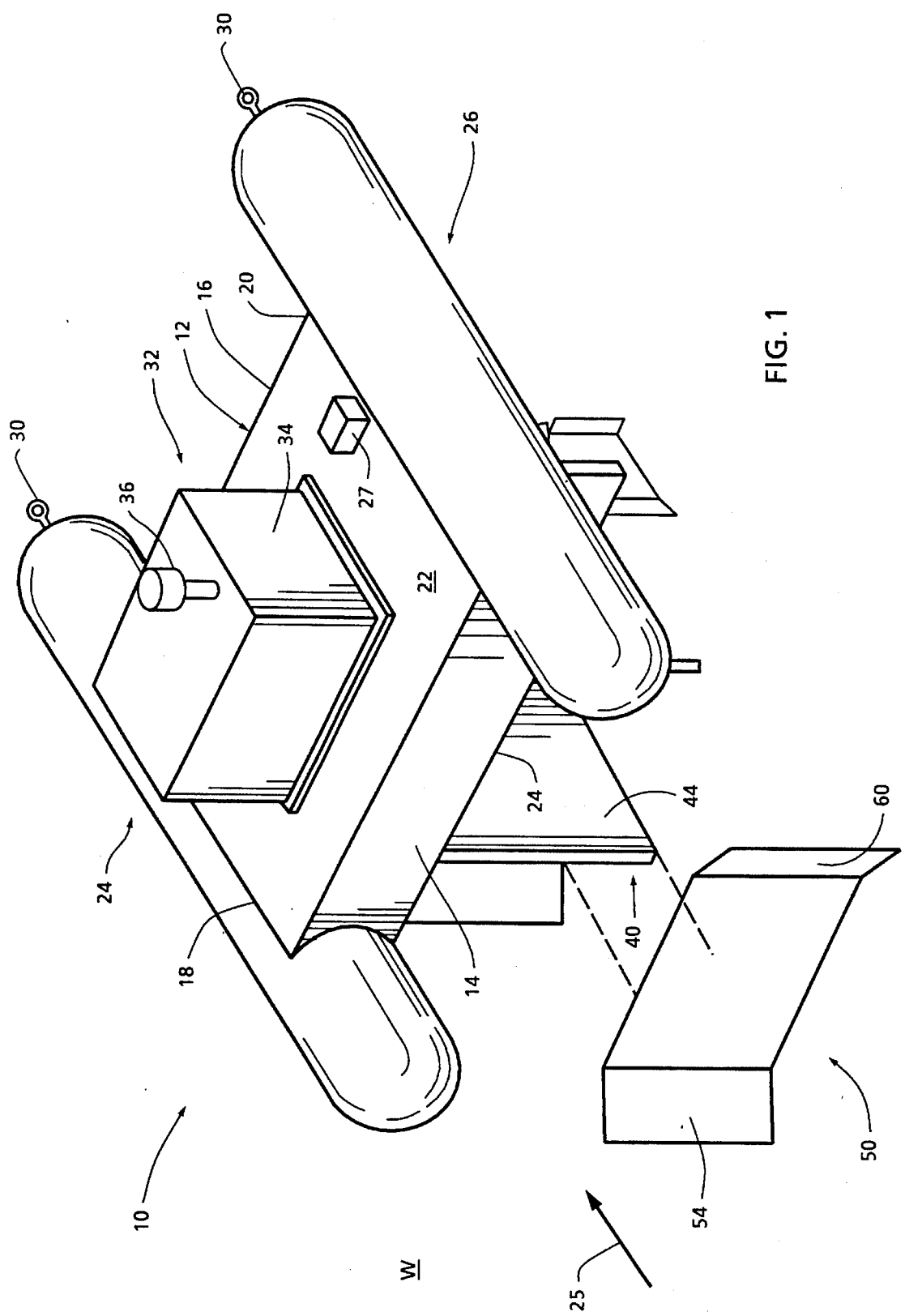
FIG. 1 is a perspective view of a device embodying the present invention, with one of the hydrowings being shown, but separated from a radial arm for the sake of convenience of illustration, it being understood that a hydrowing is connected to each radial arm.

Shown in FIG. 1 is a device 10 for converting energy associated with fluid flow into electrical energy. Broadly, device 10 includes a bridge 12 having a front end 14, a rear end 16, two sides 18 and 20, a top 22 and a bottom 24. For the sake of convenience, front end 14 will be that end facing upstream of a body of water W that is flowing in direction 25. Bridge 12 floats on top of water W with bottom 24 facing the bottom of the body of water.

Float means, such as pontoons 24 and 26, are attached to bridge 12 for maintaining the bridge means floating. The float means can include weight means, such as means 27, for adjusting the height of the device with respect to the water. One form of the means 27 includes a container for weights, such as rocks or the like. Anchor means, such as ropes or the like, are attached to the pontoons at studs 30 to maintain device 10 stationary with respect to water flowing therepast. An electrical generating means 32 is mounted on top of the bridge and includes a rotor and stator combination common to such devices. The rotor is moved with respect to the stator to generate electrical power which is used by devices connected to the generating means by a cable 34. An air stack 36 is included.

Means 40 for translating movement of the water past the bridge into rotor movement in generating means 32 is mounted on the bottom of bridge 12. Means 40 is in the form of a wheel with a plurality of spokes and includes a central arm means 42 (best shown in FIG. 2) connected to the rotor in generating means 32 and extending downwardly from bottom 24 into the water. The preferred form of arm 42 is cylindrical, but could be other shapes as well without departing from the teaching of this disclosure. Arm 42 is rotatably mounted on bridge 12.

A plurality of radial arms, such as radial arm 44, are mounted on central arm 42 at angularly spaced apart intervals. Each radial arm includes a proximal end 46 attached to central arm 42 and a distal end 48 spaced radially outward from central arm 42. A hydrowing 50 is attached to the distal end of each radial arm. The hydrowings are arranged to cause flow past the bridge to rotate central arm 42 as will be understood from the teaching of the following disclosure.

All of the hydrowings are identical; therefore, only one hydrowing will be discussed. Hydrowing $50_1$ includes a body 52 oriented to be parallel to a tangent T of central arm 42 at proximal end $46_1$ when hydrowing $50_1$ is in a neutral orientation. Hydrowing $50_1$ further includes on one end thereof a first water impact section 54 having a front surface 56 and a rear surface 58 and a second water impact section 60 on the other end thereof. Second water impact section 60 includes a first surface 62 and a second surface 64. Both water impact sections are oriented at an angle $\theta$ with respect to body 52. The absolute value of angle $\theta$ is identical for both sections.

Hydrowing $50_1$ is attached to radial arm 44 by a hinge 70 to move in directions 72' and 72" as indicated by double-headed arrow 72 under the influence of water pressure exerted thereon. A biasing means, such as a bungee cord 74, controls movement in directions 72. The hydrowings move through an angle of 45° with respect to the arm and are attached to the arm to assume an orientation of 90° with respect to that arm in one orientation of the hydrowing means with respect to the arm. A stop means, such as stop 75 can be located on either a radial arm or on a hydrowing to limit the movement of the hydrowing to the aforementioned 45° and so that at least one orientation position of the hydrowing means with respect to the arm is perpendicular.

Figure 2:
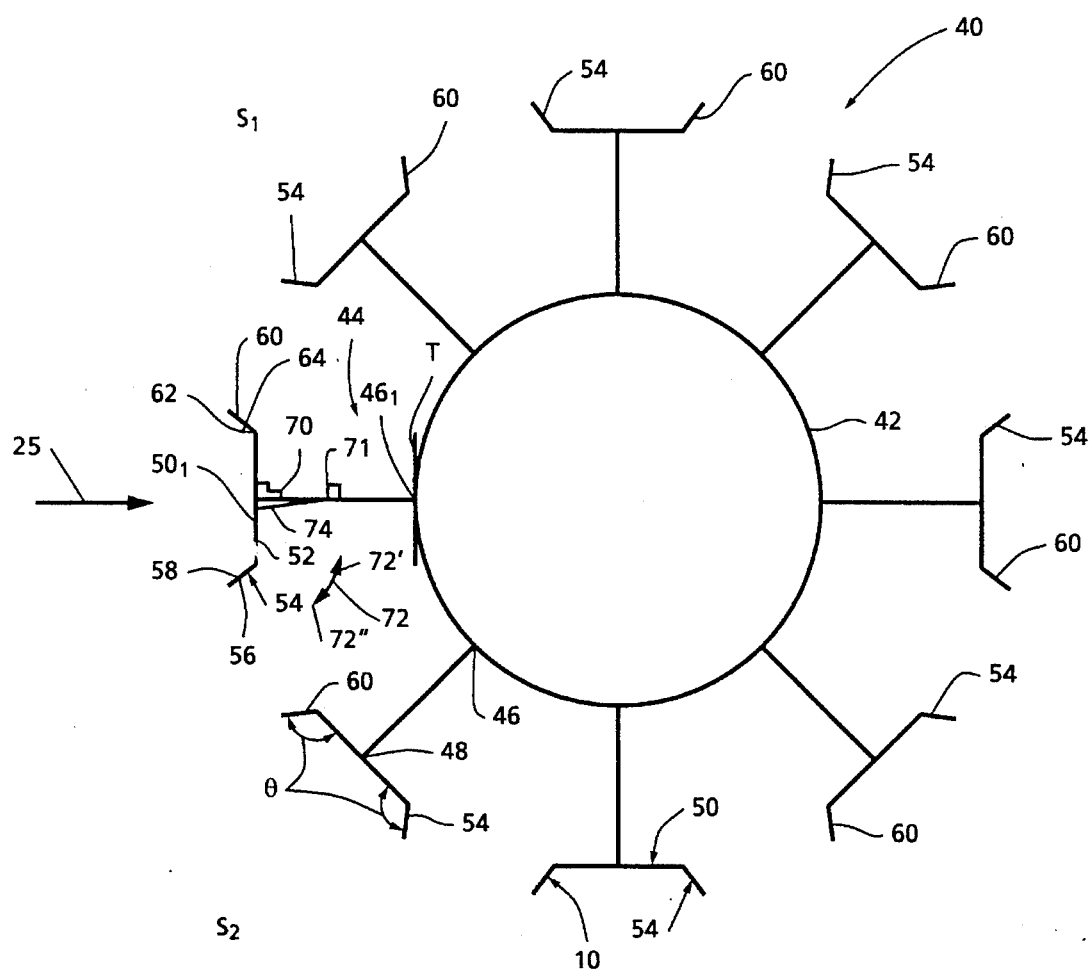
FIG. 2 is a plan view of the means which shows eight arms for translating water flow energy into rotary motion of a central arm, which is connected to a rotor element in a power conversion device which converts such rotary movement of the central arm into electrical power.

As can be seen from FIG. 2, water impact section 54 is larger than water impact section 60. Due to the orientation and sizing of these water impact sections, the total surface area exposed to water flow pressure by the water impact sections is greater on side $S_1$ of central arm 42 than on side $S_2$ which is diametrically opposite to side $S_1$. This difference in surface area causes an unbalanced pressure to act on arm 42. The unbalance pressure causes central arm 42 to rotate in the direction dictated by the unbalanced pressure. For example, if pressure on side $S_1$ exceeds pressure on side $S_2$, center arm 42 will tend to rotate in a clockwise direction in FIG. 2. Hydrowings will tack when appropriate so power can be continuously generated.

Figure 3:
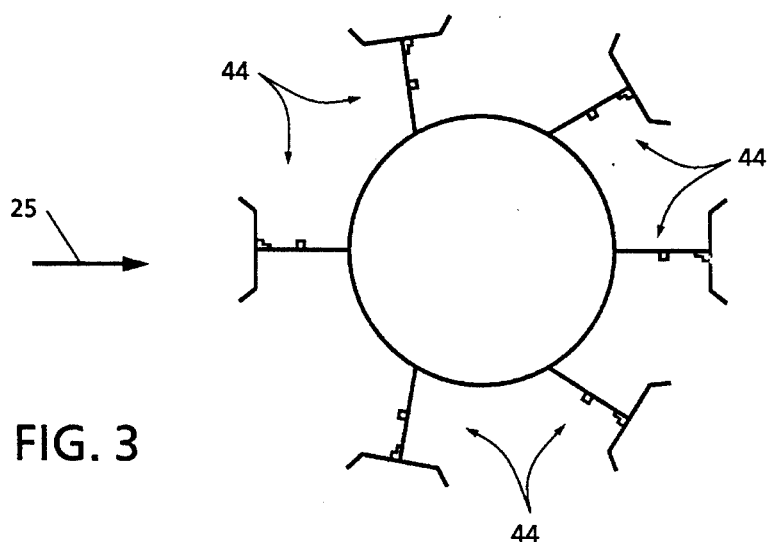
FIG. 3 is a plan view of the means for translating water flow energy into mechanical rotary energy which shows six radial arms.

The preferred form of device 10 includes six arms 44 as shown at FIG. 3, and the hydrowings are adapted to assume angles between whereby power is generated through a substantial angle of rotation of central arm 42. Device 10 can be manufactured of any suitable material, and can be any suitable size. FIG. 2 shows eight arms to show that other numbers of arms can be used without departing from the scope of the present invention.

It is understood that while certain forms of the present invention have been illustrated and described herein, it is not to be limited to the specific forms or arrangements of parts described and shown.

What is claimed is:

1. A device for converting energy associated with fluid flow into electrical energy comprising:
   A) a bridge having a front end, a rear end, two sides, a top and a bottom, said bridge top being located above water when said bridge is located in a body of moving water, such as a stream;
   B) float means attached to said bridge for maintaining said bridge afloat in the water;
   C) anchor means attached to said bridge for holding said bridge stationary with respect to water flowing therepast in a selected location in the water whereby water flows past said bridge;
   D) power generating means on said bridge for converting rotary movement into electrical power; and
   E) translating means mounted on said bridge for translating movement of water past said bridge into rotary movement including
      (1) a central arm means rotatably mounted on said bridge and connected to said power generating means and extending from said bottom into the water for applying rotary movement to said power generating means, and
      (2) means mounted on said central arm for converting water movement past said bridge into rotary movement of said central arm including
         (a) a plurality of radial arms, each radial arm attached at a proximal end thereof to said central arm and having a distal end spaced radially outward from said central arm, and
         (b) a hydrowing movably attached to the distal end of each radial arm, each hydrowing including
            (i) a body oriented to be parallel to a tangent to said central arm at the proximal end of the radial arm to which said body is attached when the hydrowing is in a neutral orientation,
            (ii) a first water impact section on one end of said body and having a front surface and a rear surface,
            (iii) a second water impact section on a second end of said body and having a first surface and a second surface,
            (iv) each of said first water impact sections being oriented at a first angle with respect to the body to which it is attached and having a front water impact area on said front surface and a rear water impact area on said rear surface,
            (v) each of said second water impact sections being oriented at a second angle with respect to the body to which it is attached and having a first water impact area on said first surface and a second water impact area on said second surface,
            (vi) said first and second angles having equal absolute values,
            (vii) said first water impact section being larger than said second water impact section, and
            (viii) attaching means on each radial arm movably connecting the hydrowing on that arm to that radial arm for orienting each hydrowing with respect to the flow direction of the water flowing past said bridge to present a greater total impact area on one side of said central arm than on the diametrically opposite side of said central arm whereby a net force is generated by the water flowing past said bridge on said central arm tending to rotate said central arm, said attaching means being located between said first water impact section and said second water impact section.

2. The device defined in claim 1 wherein said attaching means includes a hinge and a biasing means connected at one end to the radial arm associated with each hydrowing and at another end thereof to the hydrowing.

3. The device defined in claim 2 wherein said biasing means includes a bungee cord.

4. The device defined in claim 3 wherein there are eight radial arms.

5. The device defined in claim 3 wherein said central arm is cylindrical.

6. The device defined in claim 3 wherein there are six radial arms.

7. The device defined in claim 6 further including stop means on said radial arms for constraining each hydrowing to move through a maximum angle of 45° with respect to the arm to which it is attached.

8. The device defined in claim 7 wherein said stop means is located so a hydrowing has at least one orientation with respect to the arm that is perpendicular to the arm.

9. The device defined in claim 1 wherein said front surface has a surface area greater than said second surface.

* * * * *